April 30, 1963 W. R. SCHOLLE 3,087,518
PACKAGING MEANS
Filed Sept. 29, 1960 2 Sheets-Sheet 1

INVENTOR.
WILLIAM R. SCHOLLE
BY
Gary, Desmond & Parker
ATTYS.

April 30, 1963    W. R. SCHOLLE    3,087,518
PACKAGING MEANS
Filed Sept. 29, 1960    2 Sheets-Sheet 2
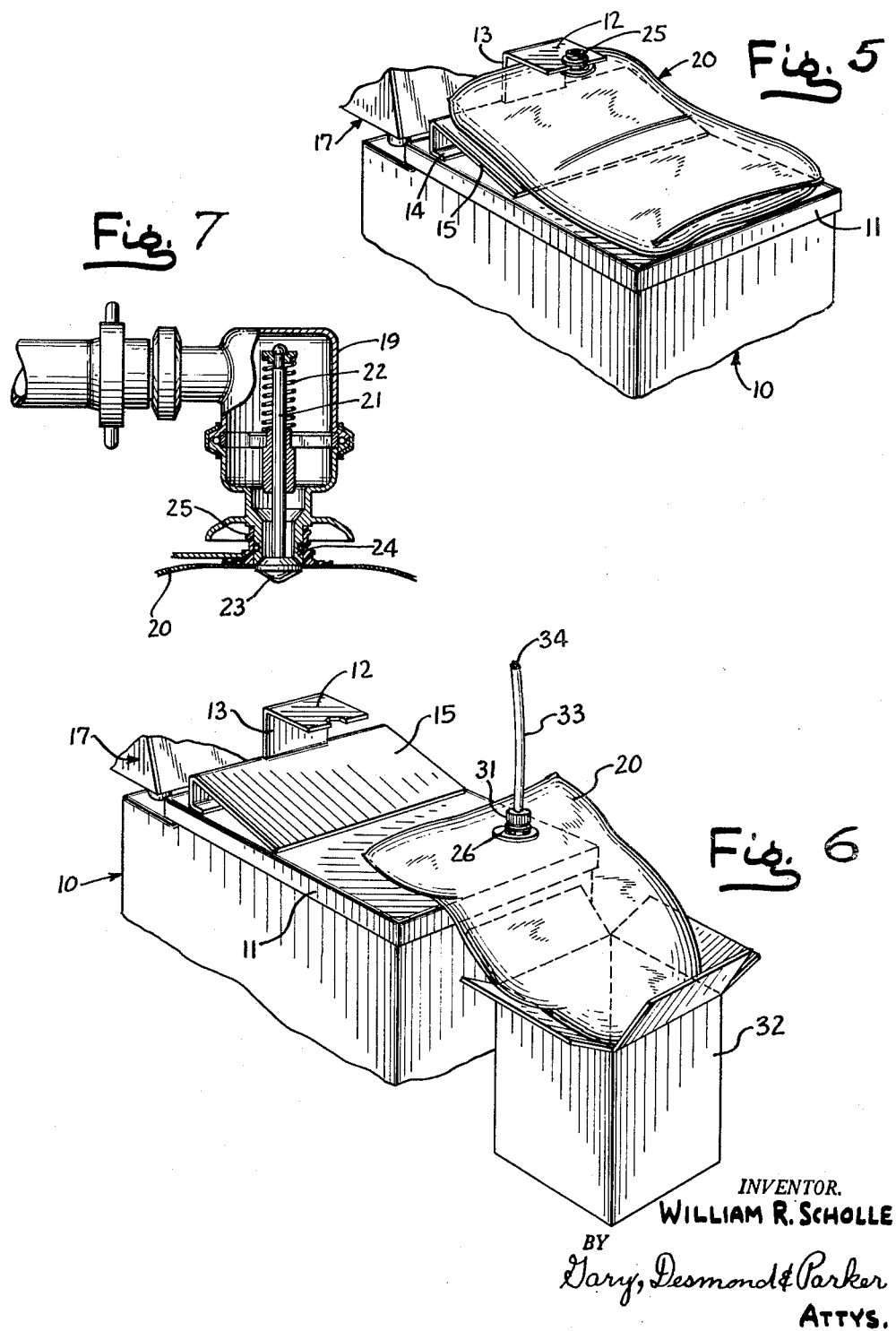

United States Patent Office 3,087,518
Patented Apr. 30, 1963

3,087,518
PACKAGING MEANS
William R. Scholle, Newport Beach, Calif., assignor, by mesne assignments, to Scholle Container Corporation, Long Beach, Calif., a corporation of Illinois
Filed Sept. 29, 1960, Ser. No. 59,346
11 Claims. (Cl. 141—83)

This invention relates to means for filling flexible, collapsible receptacles, composed of plastic sheet material such as is used for liner bags for paperboard cartons, wherein these liner bags include a filling and pouring spout secured to one surface of the liner bag and embracing an apertured area thereof.

In one specific embodiment, the present invention relates to scale means for supporting said liner bags during weighed filling thereof in a manner whereby the nozzle of the liner bag is supported above the scale platform in a manner whereby it can be conveniently capped by means of a screw cap, friction cap, or a film of plastic sheet material.

It is a further object of the present invention to provide a weighing scale platform with means adapted to engage the spout of the liner bag in a manner whereby it is held against relative rotation so as to be conveniently engaged by a screw cap.

Another object of the present invention is to provide means on the weighing scale platform for holding the nozzle of the liner bag in a position whereby the bag may be conveniently filled with fluent material from a supply nozzle disposed thereover and adapted to project into the nozzle to accomplish filling in a substantially drip-free manner.

A further object pertains to the provision of means on the scale platform for supporting a liner bag during filling thereon in a partially inclined manner between the scale platform and means disposed thereover for holding the nozzle of the liner bag.

A further object relates to means for holding and supporting a liner bag on a weighing scale platform during filling thereof in a manner whereby the necessity for gripping the nozzle by hand when the closure is being applied is eliminated and which concomitantly permits the nozzle section to be relatively short, with economy of material and packaging facility.

In another specific embodiment, the present invention relates to a novel construction and arrangement of the filling and dispensing spout secured to the liner bag, wherein the nozzle is provided with an annular collar intermediate its length and is thereby adapted to be suspended on notched or forked means during the filling thereof with fluent material on a weighing scale.

Another object is to provide a filling spout having such intermediate flange, with a collar area fashioned therebelow of angular contour and with a pair of opposed sides or faces in parallel relationship, such as for example square or hexagonal, and adapted thereby to be engaged between two spaced, parallel means or edges, as for example in the notch of an arm disposed on and above the platform of a filling scale against relative rotation for securement of a screw cap.

Other objects and advantages of the present invention and its details of construction and arrangement of parts, and the economies thereof, will be apparent from the following specification and accompanying drawings, wherein:

FIG. 5 is a fragmentary perspective view of a portion of the assembly shown in FIG. 1.

FIG. 6 is a perspective view of the components shown in FIG. 5 in a progressive and successive stage, illustrating the liner bag capped and being deposited into a paperboard carton.

FIG. 7 is a fragmentary detail view with parts in section showing means for filling the liner bag with fluent material.

Figure 1:
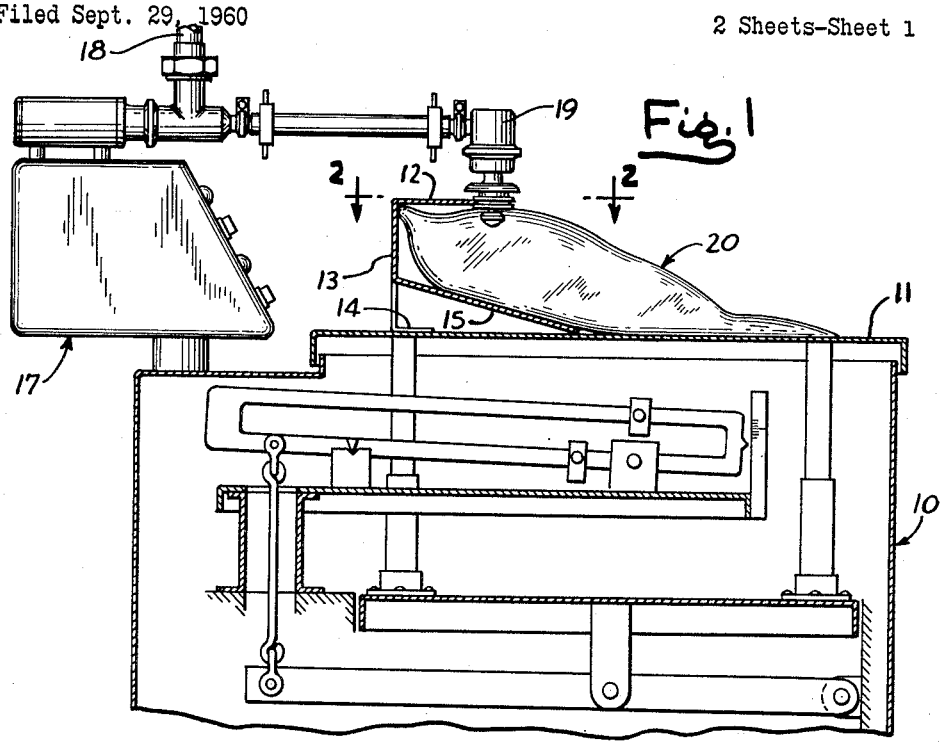
FIG. 1 is a side elevational view, partly in section, of a filling scale, with means disposed on the platform thereof for supporting a liner bag of the class described during filling thereof with fluent material.

Referring to the drawings, and particularly to FIG. 1, the reference numeral 10 generally indicates a scale of a filling machine comprising a scale platform 11, the platform comprising a horizontally disposed arm 12 supported thereon and spaced in parallel relationship thereto by means of the standard 13 secured, as by welding, to the platform 11 by means of the foot portion 14. The platform 11 further comprises a support member 15 which extends from the portion intermediate thereof to the portion intermediate the height of the standard 13, so that it extends obliquely and is disposed substantially beneath the horizontal arm 12.

Figure 2:
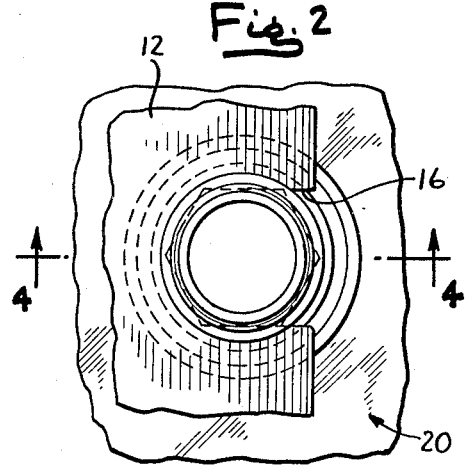
FIG. 2 is a relatively enlarged fragmentary detail view taken on the line 2—2 of FIG. 1.
Figure 3:
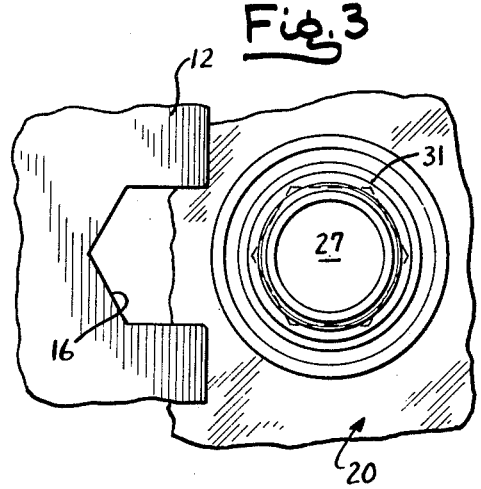
FIG. 3 is a view of the parts shown in FIG. 2 in separated relationship.
Figure 4:
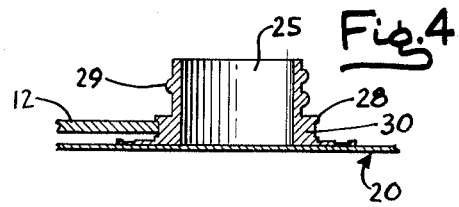
FIG. 4 is a section on the line 4—4 of FIG. 2.

As shown in the views of FIGS. 2 and 3, the arm 12 is provided with a forwardly opening notch 16 having at least two defining sides which are parallel to each other, and although in the present illustrations the rearward terminal of the notch 16 is formed by two inclined lines such as might receive an object of hexagonal configuration, this rearward or inwardly defining end portion of slot 16 may be arcuate or straight and normal to the opposed defining sides.

Suitably supported on and connected to the scale means 10, in a manner not shown, is the control unit generally indicated as 17 for cutting off liquid supplied from the conduit 18 to the filling head 19 after a predetermined amount of liquid material has been dispensed into a liner bag, generally indicated as 20, disposed on the scale platform 11 in a manner well understood. In filling head 19, pressure of the liquid during supply causes depression of the plunger 21 against a spring 22, to open the valve as shown in FIG. 1, FIG. 7 showing the valve head 23 carried by the plunger 21 in closed, seated position against the valve seat 24, but disposed within the nozzle 25.

This nozzle 25 is secured, as by heat sealing, to one wall of the liner bag 20 in an integral manner by means of the nozzle flange 26 which is secured about an opening 27 in one wall of the liner bag 20. As previously indicated, the liner bag is composed of flexible, collapsible, plastic sheet material such as polyethylene and is suitably of pillow form, resulting from the transverse sealing of the severed edges of a tube of the plastic sheet material.

As a characterizing feature of the present invention, the filling and pouring spout 25 is formed with an annular flange 28 intermediate its length, which flange is adapted to seat over the notched area of arm 12 on the scale platform for supporting the liner bag thereabove during filling. In this arrangement the spout opening upwardly in a manner whereby the valve and seat portion of the filler head 19 may be disposed within the spout 25 so that liquid will not spill or overflow or leak with economy of materials dispensed into the liner bag regardless of its character and without problems of any kind resulting in spillage or waste.

While in this position, after the bag has been filled with a weighed amount of liquid, the nozzle can be closed with a film of thermoplastic material by heat sealing means not shown, the nozzle 25 also being preferably of thermoplastic material. While the nozzle 25 is maintained in position on the arm 12 the nozzle may also be suitably closed with a pressure-fit closure not shown but as will be understood by those skilled in the art.

In the alternative, and as shown, the outer upper or end portion of the nozzle is formed with a thread 29 or equivalent means for engagement thereover of a screw cap. In such event and for such purposes, the nozzle is formed with an angular collar portion 30, beneath the flange 28, having an opposed pair of parallel sides such as is provided by the hexagonal contour 31, or a square contour not shown.

The width of the opening of the notch 16 and between its parallel defining sides is such as to snugly embrace the hexagonal or square of the collar 30 and to thus hold it against relative rotation while applying a screw cap thereover. Although the use of the angular contour on the collar 30 is preferable for the reasons aforesaid, such collar can be cylindrical in the instance when the nozzle 25 is closed by a film or pressure cap, as previously indicated.

The inclined support 15 on the scale platform 11, in addition to aiding in supporting the bag while it is being filled during engagement of the nozzle 25 on the forked arm 12, insures the nozzle being disposed above the center portion of the filled pillow-shaped bag and thus prevents backflow before the desired amount of liquid is disposed in the bag. The inclined support 15 also aids in removing the filled bag from the sale platform after the filling head 19 has been withdrawn from the spout 25 and the spout has been closed. As shown for example in FIG. 6, a screw cap 31 has been applied to the nozzle 25, and the nozzle is withdrawn from the notched arm 12 and slid forwardly by the impetus given by the inclined platform portion 15 and into an upper paperboard container 32 disposed adjacent to the scale 10.

Although FIG. 6 shows a screw cap 31 having an elongated hose 33 attached thereto with closure tip 34, it will be understood that a conventional closure cap may be engaged over the nozzle 25.

It will thus be seen that I have provided means for allowing a liner bag of collapsible plastic sheet material to be firmly held in proper place on a filling machine and means for securely gripping the nozzle thereof when a screw cap or other closure is being secured thereto, eliminating the necessity of gripping the nozzle by hand when the closure is being applied, and thus also permitting the nozzle section to be shortened.

It will be further seen that the means of the present invention holds or permits the nozzle of the collapsible bag to be held in a firm, upwardly disposed position so that liquid will not spill, or overflow, or leak in filling, and that the means provided herein firmly holds the spout of the liner bag on the scale in a manner one can easily insert or withdraw the filling head.

While I have shown and described the preferred embodiment of my invention, it will be apparent that various changes and modifications may be made therein without departing from the scope of the invention, as defined by the appended claims.

I claim:

1. Means for filling a flexible collapsible receptacle composed of plastic sheet material with fluent material comprising a relatively rigid filling and pouring spout secured to one surface of said receptacle and embracing an apertured area thereof, an integral annular flange embracing said spout intermediate its length, an integral non-circular formation on said collar disposed beneath said flange having opposed relatively flattened areas disposed inwardly of the extent of said flange, and scale means for supporting said receptacle during weighed filling comprising a horizontally disposed arm supported on and in spaced parallel relationship to the scale platform, said arm being formed with a notch for non-rotatable reception of said non-circular spout formation beneath said flange and for partially supporting said receptacle thereby.

2. Means for filling a flexible collapsible receptacle composed of plastic sheet material with fluent material comprising a relatively rigid filling and pouring spout secured to one surface of said receptacle and embracing an apertured area thereof, an integral annular flange embracing said spout intermediate its length, an integral non-circular formation on said collar disposed beneath said flange having opposed relatively flattened areas disposed inwardly of the extent of said flange, and scale means for supporting said receptacle during weighed filling comprising a horizontally disposed arm supported on and in spaced parallel relationship to the scale platform, said arm being formed with a notch for non-rotatable reception of said non-circular spout formation beneath said flange and for partially supporting said receptacle thereby, and an inclined plate on said platform beneath said arm for aiding in supporting said receptacle during filling thereof.

3. Means for filling a flexible collapsible receptacle composed of plastic sheet material with fluent material comprising a filling and pouring spout secured to one surface of said receptacle and embracing an apertured area thereof, a spaced pair of integral annular flanges embracing said spout intermediate its length, and an integral angular collar having an opposed relatively flattened parallel pair of peripheral faces on said spout disposed between and inwardly of the extent of said flanges, and scale means for supporting said receptacle during weighed filling comprising a horizontally disposed arm supported on and in spaced parallel relationship to the scale platform, said arm being formed with a notch having opposed parallel defining sides for reception of said spout beneath said flange and for partially supporting said receptacle thereby, and for snugly anchoring and retaining said collar against relative rotation.

4. Scale means for supporting a flexible collapsible receptacle composed of plastic sheet material during weighed filling with fluent material comprising a platform and a horizontally disposed arm supported on and in spaced parallel relation to and above said platform, said arm being formed with a notch for anchoring and for slidable reception and non-rotatable retention of a non-circular collar formation on a filling and pouring spout having opposed relatively flattened areas secured to one surface of said receptacle disposed beneath and inwardly of the extent of an integral annular flange embracing said spout intermediate its length.

5. Scale means for supporting a flexible collapsible receptacle composed of plastic sheet material during weighed filling with fluent material comprising a platform, a horizontally disposed arm supported on and in spaced parallel relation to and above said platform, said arm being formed with a notch for anchoring and for slidable reception and non-rotatable retention of a non-circular collar formation on a filling and pouring spout having opposed relatively flattened areas secured to one surface of said receptacle disposed beneath and inwardly of the extent of an integral annular flange embracing said spout intermediate its length, and an inclined plate on said platform beneath said arm for aiding in supporting said receptacle during filling thereof.

6. Scale means for supporting a flexible collapsible receptacle composed of plastic sheet material during weighed filling with fluent material comprising a platform, a horizontally disposed arm supported on and in spaced parallel relation to and above said platform, said arm being formed with a notch having opposed parallel defining sides for reception of a filling and pouring spout secured to one surface of said receptacle beneath an integral annular flange embracing said spout intermediate its length, and in snug anchoring and embracing engagement with an angular collar portion on said spout having opposed relatively flattened areas beneath and inwardly of the extent of said flange.

7. In combination, a flexible collapsible receptacle for fluent material composed of plastic sheet material, a relatively rigid filling and pouring spout secured to one surface of said receptacle and embracing an apertured area thereof, a spaced pair of integral annular flanges embracing said spout and a non-circular peripheral formation having opposed relatively flattened surfaces of substantial area on said spout disposed between and inwardly of the extent of said flanges for supporting said receptacle during filling on a horizontally disposed arm supported on and in spaced parallel relationship to a weighing scale platform wherein said arm is formed with a notch for reception of said spout intermediate said flanges and for partially supporting and preventing rotation of said receptacle thereby.

8. In combination, a flexible collapsible receptacle for fluent material composed of plastic sheet material, a relatively rigid cylindrical filling and pouring spout comprising an integral flange secured to one surface of said receptacle and embracing an apertured area thereof, and an integral annular flange embracing said spout intermediate its length defining a collar therebeneath having opposed relatively flattened surfaces of substantial area disposed between and inwardly of the extent of said flanges for anchoring and preventing rotation of said spout on holding means therefor.

9. In combination, a flexible collapsible receptable for fluent material composed of plastic sheet material, a filling and pouring spout including an integral flange secured to one surface of said receptacle and embracing an apertured area thereof, and an integral annular flange embracing said spout intermediate its length defining a collar therebeneath, said collar having an opposed pair of parallel peripheral defining surface areas disposed between and inwardly of the extent of said flanges receivable between spaced parallel arms of holder means adapted to support said receptacle on said flange against relative rotation.

10. In combination, a flexible collapsible receptacle for fluent material composed of plastic sheet material, a filling and pouring spout including an integral flange secured to one surface of said receptacle and embracing an apertured area thereof and an integral annular flange embracing said spout intermediate its length defining a collar therebeneath, the peripheral contour of said collar being hexagonal and disposed inwardly of the extent of said flanges for anchoring and preventing rotation of said spout on holding means therefor.

11. In combination, a flexible collapsible receptacle for fluent material composed of plastic sheet material, a relatively rigid filling and pouring spout secured to one surface of said receptacle and embracing an apertured area thereof, a spaced pair of integral annular flanges embracing said spout and a non-circular peripheral formation having opposed relatively flattened areas on said spout disposed between and inwardly of the extent of said flanges for anchoring and preventing rotation of said spout on holding means therefor.

References Cited in the file of this patent

UNITED STATES PATENTS

| | | |
|---|---|---|
| 2,285,279 | Hohl et al. | June 2, 1942 |
| 2,317,865 | Talbot | Apr. 27, 1943 |
| 2,575,870 | Gates | Nov. 20, 1951 |
| 2,750,091 | Mattimoe et al. | June 12, 1956 |

FOREIGN PATENTS

| | | |
|---|---|---|
| 451,929 | France | Feb. 24, 1913 |